US008800057B2

(12) United States Patent
Ho et al.

(10) Patent No.: US 8,800,057 B2
(45) Date of Patent: Aug. 5, 2014

(54) SECURE CONTENT DELIVERY SYSTEM AND METHOD

(75) Inventors: Edwin Ho, Palo Alto, CA (US); King Sun Wai, Fremont, CA (US); Edward Potocko, Mountain View, CA (US)

(73) Assignee: Samsung Information Systems America, Inc., San Jose, CA (US)

( * ) Notice: Subject to any disclaimer, the term of this patent is extended or adjusted under 35 U.S.C. 154(b) by 335 days.

(21) Appl. No.: 12/889,332

(22) Filed: Sep. 23, 2010

(65) Prior Publication Data
US 2011/0072521 A1 Mar. 24, 2011

Related U.S. Application Data

(60) Provisional application No. 61/245,662, filed on Sep. 24, 2009.

(51) Int. Cl.
H04N 7/16 (2011.01)
(52) U.S. Cl.
USPC .......................................................... 726/29
(58) Field of Classification Search
CPC .............. G06F 21/10; G06F 17/30029; G06F 17/30041; H04L 63/10; H04L 2463/101
USPC ............................................ 726/29; 709/217
See application file for complete search history.

(56) References Cited

U.S. PATENT DOCUMENTS

| 8,046,589 B2 * | 10/2011 | Akkermans et al. | 713/186 |
| 2003/0204743 A1 | 10/2003 | Clarke et al. | |
| 2006/0161635 A1 * | 7/2006 | Lamkin et al. | 709/217 |
| 2008/0020738 A1 | 1/2008 | Ho et al. | |
| 2008/0235142 A1 * | 9/2008 | Gonze et al. | 705/59 |
| 2008/0306936 A1 | 12/2008 | Ho et al. | |
| 2010/0077463 A1 * | 3/2010 | Rickelton-Abdi | 726/5 |

FOREIGN PATENT DOCUMENTS

| JP | 2008191749 | 8/2008 |
| WO | WO 02/19598 A2 | 3/2002 |
| WO | 2008073981 A1 | 6/2008 |

OTHER PUBLICATIONS

PCT/US2010/050283 International Search Report dated Nov. 22, 2010.
PCT/US2010/050283 Written Opinion dated Nov. 22, 2010.
International Preliminary Report on Patentability dated Apr. 5, 2012 for International Application No. PCT/US2010/050283 from International Bureau of WIPO, pp. 1-7, Geneva, Switzerland.
European Search Report dated Mar. 15, 2013 for European Application No. 10819565.2 from European Patent Office, pp. 1-8, Rijswijk, Netherlands.

(Continued)

*Primary Examiner* — Phuoc Nguyen
*Assistant Examiner* — Davoud Zand
(74) *Attorney, Agent, or Firm* — Kenneth L. Sherman, Esq.; Michael Zarrabian, Esq.; Sherman & Zarrabian LLP (57) ABSTRACT

A system and method for secure content delivery is provided. The system and method has a content system that verifies a device with a media player based on one or more properties of the device with the media player wherein the content system delivers content to the device with the media player only when the device with the media player is verified.

21 Claims, 5 Drawing Sheets

(56) References Cited

OTHER PUBLICATIONS

Japanese Office Action dated Oct. 7, 2013 for Japanese Application No. 2012-531082 from Japan Patent Office, pp. 1-6, Tokyo, Japan (English-language translation pp. 4-6).

Canadian Examiner's Report dated Nov. 22, 2013 for Canadian Application No. 2,775,377 from Canadian Intellectual Property Office, pp. 1-2, Ontario, Canada.

Korean Office Action dated Dec. 23, 2013 for Korean Application No. 10-2012-7010507 from Korean Intellectual Property Office, pp. 1-7, Seo-gu, Daejeon, Republic of Korea (English-language translation attached, pp. 1-3).

European Examination Report dated Jan. 22, 2014 for European Application No. 10819565.2 from European Patent Office, pp. 1-5, Rijswijk, Netherlands.

* cited by examiner

SECURE CONTENT DELIVERY SYSTEM AND METHOD

PRIORITY CLAIMS/RELATED APPLICATIONS

This application claims the benefit under 35 USC 119(e) and 120 to U.S. Provisional patent application Ser. No. 61/245,662 filed on Sep. 24, 2009 and entitled "Secure Content Delivery System and Method", the entirety of which is incorporated herein by reference.

FIELD

The disclosure relates generally to a system and method for securely delivering content to a device.

BACKGROUND

Content streaming systems and methods are known. In most of these systems, the content provider provides a client application so that they can securely stream content to a device. When the content provider controls the client application, a certificate at the content provider and on the client application can be used to provide secure streaming content to the device. However, if the content provider does not have control of the client application, then certificates cannot be used to provide secure streaming of content. It is desirable to provide a system and method that allow for the secure delivery of content to devices with the content player is not provided by the content provider and it is to this end that the disclosure is directed.

DETAILED DESCRIPTION OF ONE OR MORE EMBODIMENTS

Figure 1:
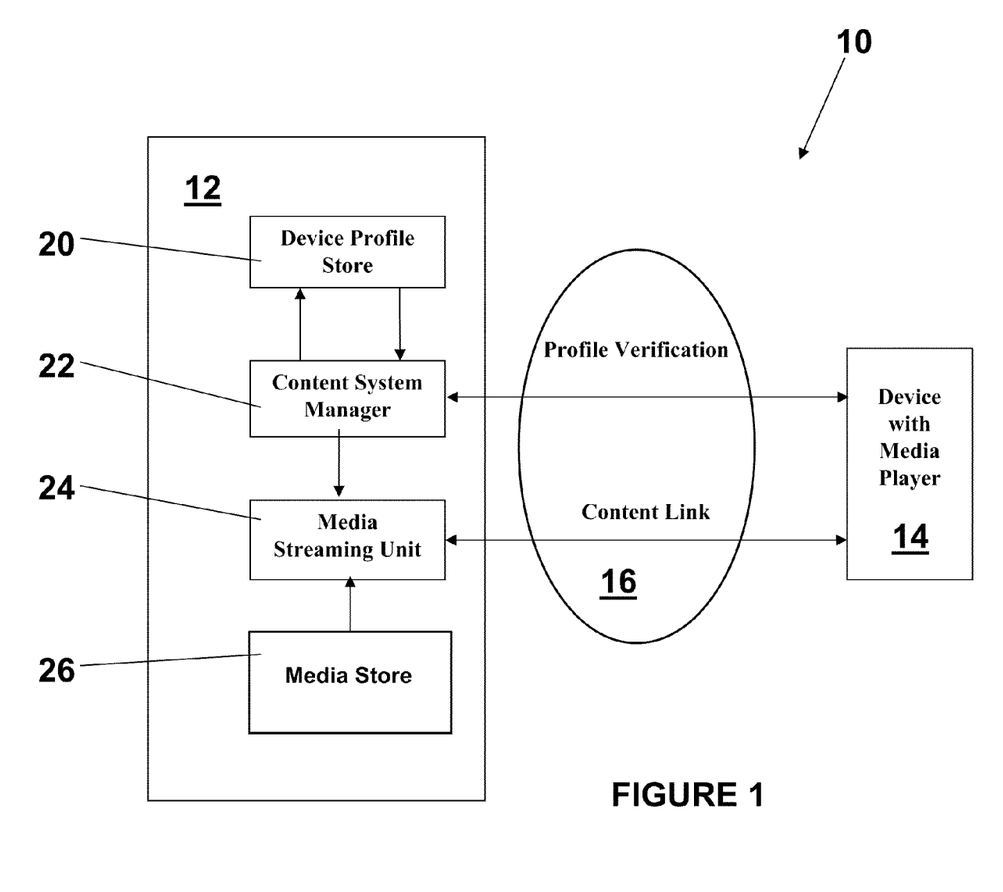
FIG. 1 illustrates a secure content delivery system.

FIG. 1 illustrates a secure content delivery system 10 that allows for the secure delivery of content from a content system 12 to one or more computing devices 14 over a public link 16, such as the Internet. In one embodiment, the system may be used to securely stream movies to mobile devices and it is this embodiment that is described below. However, the disclosure is not limited to this embodiment since the system and method can be used to securely deliver various types of digital content (movies, television shows, videos, etc), the system and method can be used to securely deliver content in a non-streaming manner and the system and method can be used to securely deliver content to various different processing unit based devices with at least a display, a media player and wired or wireless connectivity capabilities such as mobile phones, smart phones (such as the Apple iPhone, Blackberry devices or Palm devices), laptop computers, desktop computers, tablet computers, gaming consoles, terminals and any other processing unit based devices with media players and wired or wireless connectivity capabilities.

In the embodiment shown in FIG. 1, the device with the media player 14 may be a wireless device that uses a digital data network such as 3G or the like, a wireless local area network, such as WiFi or a wired network to establish a connection with the content system 12. For example, as shown in FIGS. 3-6, an Apple® iPhone® can be the device with the media player 14. The system allows the content system 12 to verify that the device 14 is authorized to receive a piece of content and then securely stream the content to the device once the device has been verified. The system prevents someone from trying to steal the content by masquerading as an authorized device as described below.

The content system 12 may further include a device profile store 20, that may be implemented in various manners such as a software or hardware database, data structure or similar storage, that stores a profile for each device that may attempt to request content from the content system. The profiles have been gathered based on characteristics/properties of each device with the media player that can be used to verify that the device is authorized to have content delivered to it. The profile for each device may include a plurality of properties for each device. In one implementation, there may be 20-60 property values associated with each device. For example, the properties may include a platform of the device, the plug-ins on the device, the behavior of the plug-ins on the device, the secure protocol negotiations of the device and the like. Plug-ins are used to extend the capabilities of browser and can be upgraded independently of them. An example of a common plug-in is Flash. For the platform property, an Apple® iPhone® may have an Apple platform value, a personal computer device may have a Win32platform property, a Blackberry device may have a BB platform property, etc. As another example, for the protocol negotiation property, certain devices may negotiate encryption or a protocol in such a way that one can determine the type of device based on the protocol negotiation. Properties define unique behavior of individual browser engines on devices and platforms. It can come in the form of different results from a function call, or different levels of precision in a math request.

The content system 12 may further comprise a content system manager 22, implemented as one or more server computers executing computer code in one implementation, that performs various operations to provide secure delivery of the content as described in more detail with reference to FIG. 2. Briefly, the content system manager 22 perform profile verification as shown in FIG. 1 and also controls a media unit 24 (that may be a media streaming unit that streams content in one implementation). The media unit 24, when the device 14 is authorized to receive the content, delivers the content to the device. The media unit 24 retrieves the content to be delivered from a media store 26 that is associated with the media unit.

Figure 2:
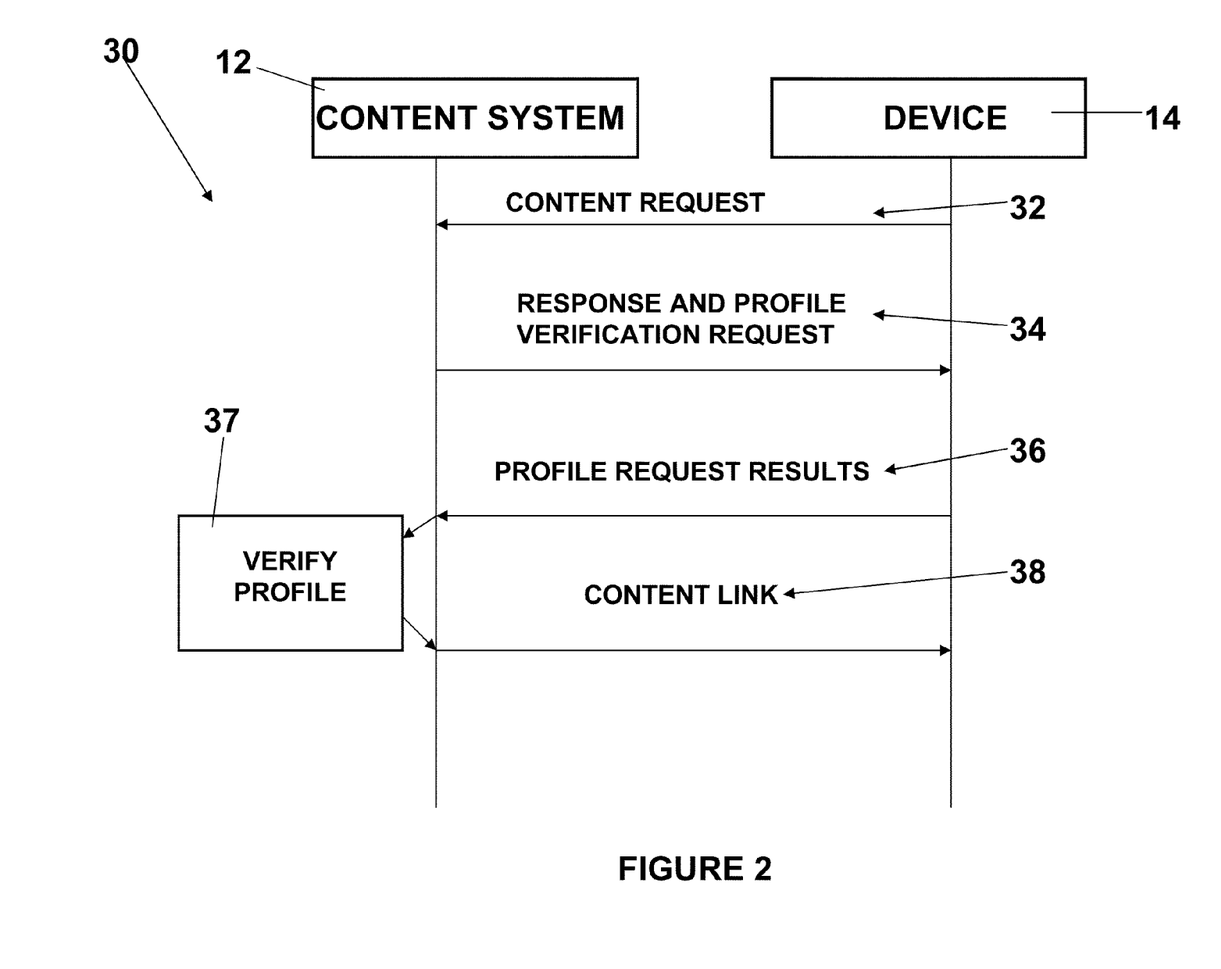
FIG. 2 illustrates a method for secure content delivery.

FIG. 2 illustrates a method 30 for secure content delivery between the content system 12 and the device 14. The device whose user wants to interact with content sends a request for the content to the content system (32) that may be delivered using various protocols such as HTTP and HTTPS. The content system (and in particular the content system manager 22) sends a response back to the device 14 that includes a profile verification request (34) that may be implemented, in one implementation, as Javascript that is sent to the device. The profile verification request requests a value of a plurality of properties of the device wherein the plurality of properties of the device are a subset of all of the properties stored in the device profile store. In addition, to enhance security of the system, each profile verification request sent out to each device may have a random number of properties, a random order of the properties and/or a different subset of the properties. Thus, even if the response from a device is intercepted, it cannot be used later to masquerade as an authorized device since each profile verification request is different in terms of the number of properties requested, in terms of the order of the property values requested and/or in terms of the particular properties contained in each request.

In response to the profile verification request, the device (using a browser application that can interpret the profile verification request), sends back a response with the profile request results (36). The profile request results may be a series of "1" and "0" that provide the values for each requested property. The content system manager 22, using the profile request results and the profile verification request for the particular device, verifies the profile of the device (37). In particular, the content system manager 22 compares the values for the requested properties in the profile request results against the values of the same properties as stored in the device profile store 20. If the values of the particular properties in the profile request results match (or are within a certain range) the values in the device profile store 20 for those same particular properties, then the content system manager 22 verifies that the device can have access to the content. Then, the content system (content system manager 22) can provide the authorization to the device (38). The authorization may be a link that allows the device to access the content or it may just allow the device to access the content over a previously provided link or path. Once authorized, the content can then be accessed by the device. If the device is not an authorized device, the content system manager 22 may send a dead link back to the device so that the device cannot access the content or the content system manager 22 may disable the content link in the media unit 24.

Figure 3:
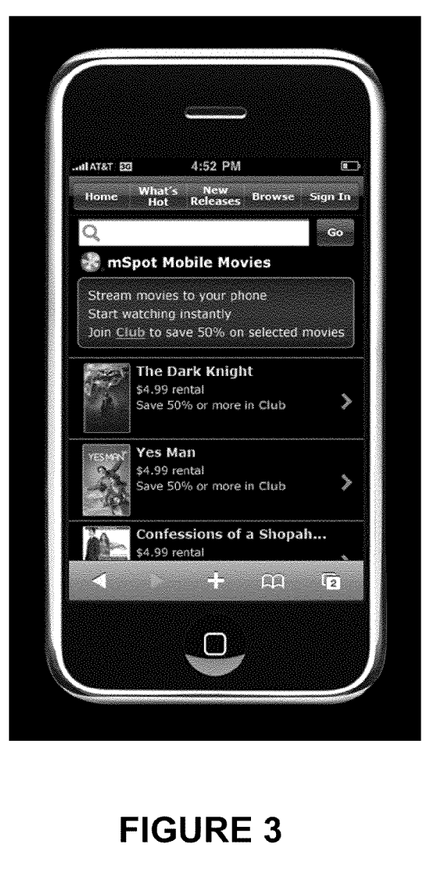
FIGS. 3-6 illustrate a device requesting and receiving a piece of content from the secure content delivery system.
Figure 4:
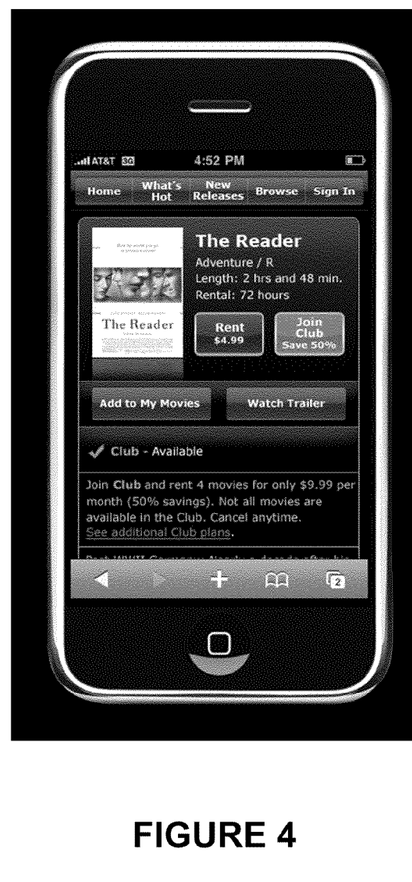
Figure 5:
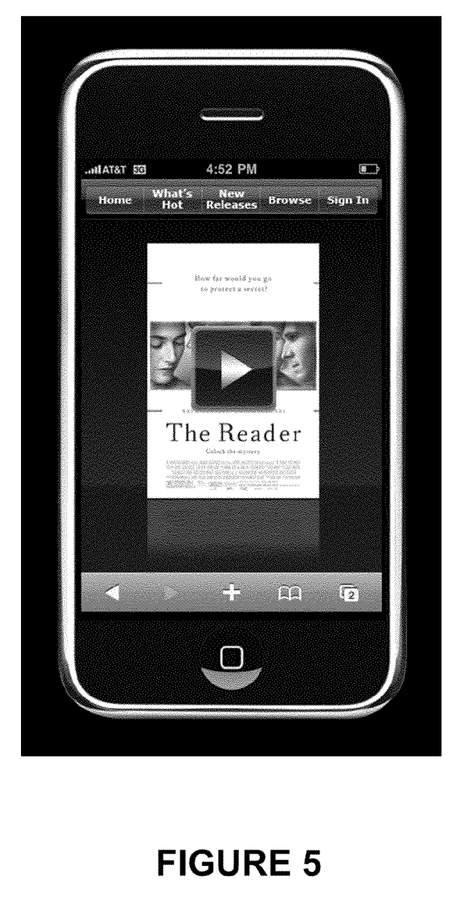
Figure 6:
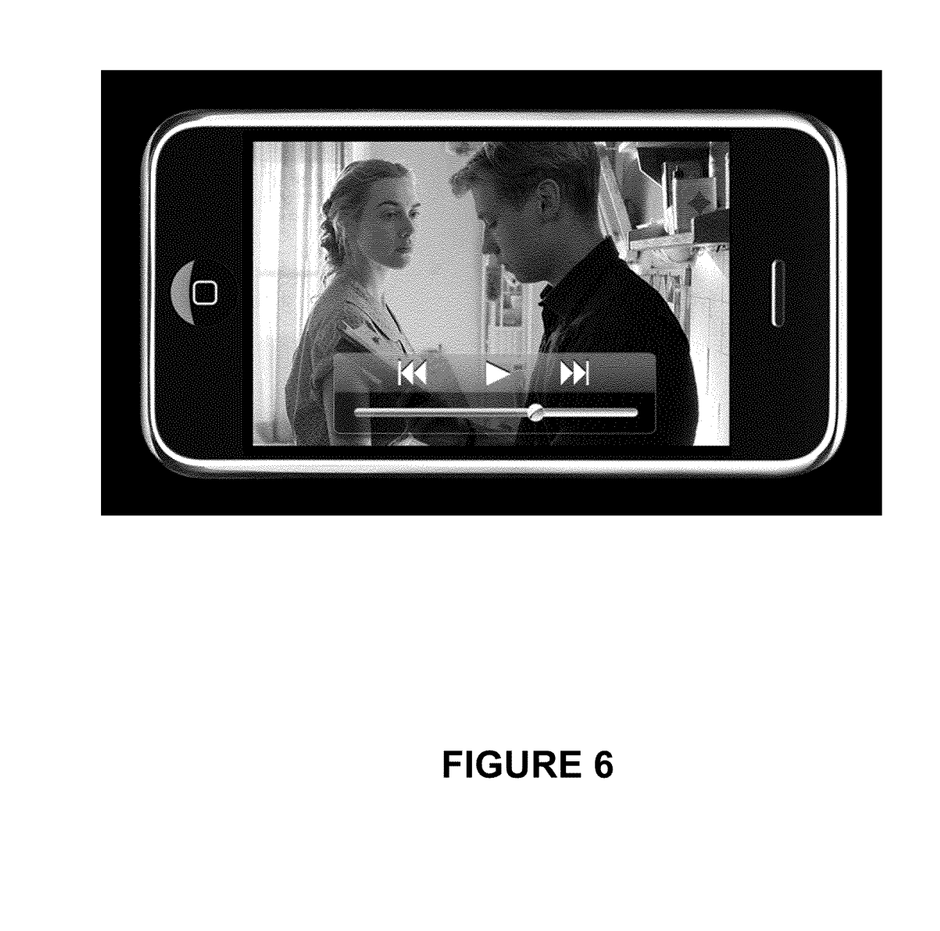

FIGS. 3-6 illustrate a device requesting and receiving a piece of content from the secure content delivery system. In particular, FIG. 3 shows a user browsing streaming movies on an Apple iPhone that are available through a service. FIG. 4 shows the user interface of the device when the user has chosen a piece of content and, in the background unknown to the user, the content system is verifying the device. Once the device is verified, the user can play the content in the media player as shown in FIGS. 5 and 6.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A delivery system for secure content delivery to a processing unit based computing device, the delivery system comprising:
a content system configured to receive a request from a processing unit based computing device with a media player for a piece of content from the content system over a link;
wherein the content system further comprises:
a content system manager that receives the request for the piece of content from the processing unit based computing device, sends a profile verification request to the processing unit based computing device, receives a profile verification request response from the processing unit based computing device, and verifies that the processing unit based computing device is authorized to access the piece of content based on the profile verification request response and a device profile of the processing unit based computing device; and
a content unit that delivers the requested piece of content to the processing unit based computing device only when the processing unit based computing device is authorized to access the piece of content;
wherein the profile verification request comprises a request for one or more properties of the device profile of the processing unit based computing device; and
wherein the content system manager is configured to send a different profile verification request to the processing unit based computing device each time the processing unit based computing device requests content from the content system manager, such that each profile verification request is different in terms of number of properties requested, order of properties requested, and particular properties requested.

2. The delivery system of claim 1, wherein the content system further comprises:
a device profile store that stores a device profile of each processing unit based computing device, wherein the stored device profile for the processing unit based computing device is used by the content system manager to verify the access authority of the processing unit based computing device, and wherein the stored device profile includes one or more properties associated with the processing unit based computing device.

3. The delivery system of claim 2, wherein:
each device profile for each processing unit based computing device further comprises a plurality of properties associated with the processing unit based computing device;
each profile verification request response from each processing unit based computing device further comprises a plurality of properties associated with the processing unit based computing device, wherein the content system manager compares the plurality of properties in the profile verification request response and the device profile for the processing unit based computing device to determine if the processing unit based computing device is authorized to access the piece of content; and
when the content system manager verifies that the processing unit based computing device is authorized to access the piece of content, the content system manager provides authorization to the processing unit based computing device, wherein the authorization comprises a link that allows the processing unit based computing device to access the piece of content.

4. The delivery system of claim 3, wherein:
for each profile verification request sent to a processing unit based computing device, the profile verification request comprises a request for at least one property associated with the processing unit based computing device; and
for each profile verification request response received from a processing unit based computing device in response to a profile verification request, the profile verification request response further comprises a value for each requested property in the profile verification request, wherein the content system manager compares the value with a value for the requested property maintained in the stored device profile for the processing unit based computing device.

5. The delivery system of claim 4, wherein:
for each profile verification request sent to a processing unit based computing device, the profile verification request comprises a request for a random number of properties associated with the processing unit based computing device.

6. The delivery system of claim 4, wherein:
for each profile verification request sent to a processing unit based computing device, the profile verification request comprises a request for a random order of properties associated with the processing unit based computing device.

7. The delivery system of claim 4, wherein:
for each profile verification request sent to a processing unit based computing device, the profile verification request comprises a request for a subset of properties associated with the processing unit based computing device.

8. The delivery system of claim 3, wherein:
the plurality of properties associated with a processing unit based computing device further comprise a platform of the processing unit based computing device, a plug-in installed on the processing unit based computing device, a behavior of the plug-in installed on the processing unit based computing device, and a secure protocol negotiation of the processing unit based computing device.

9. The delivery system of claim 1, wherein:
the content system manager disables a link for accessing the piece of content when the content system manager determines, based on the profile verification request response, that the processing unit based computing device is not authorized to access the piece of content.

10. The delivery system of claim 1, wherein:
the content unit further comprises a streaming media unit; and
the content is one of a movie, a television show and a video, music and images.

11. The delivery system of claim 1, wherein:
the content system manager sends a different profile verification request to the processing unit based computing device each time the content system manager receives a request for a piece of content from the processing unit based computing device.

12. A method for secure content delivery to a processing unit based computing device with a media player, the method comprising:
receiving a request from a processing unit based computing device with a media player for a piece of content;
generating a profile request;
transmitting the profile request to the processing unit based computing device that is requesting the piece of content;
receiving a response to the profile request from the processing unit based computing device;
verifying the processing unit based computing device is authorized to access the piece of content based on the response to the profile request and a device profile of the processing unit based computing device; and
delivering the piece of content to the processing unit based computing device once the processing unit based computing device is verified;
wherein the profile request comprises a request for one or more properties of the device profile of the processing unit based computing device; and
wherein a different profile request is sent to the processing unit based computing device each time the processing unit based computing device requests content, such that each profile request is different in terms of number of properties requested, order of properties requested, and particular properties requested.

13. The method of claim 12 further comprising:
storing a device profile of each processing unit based computing device, wherein the stored device profile for the processing unit based computing device is used to verify the access authority of the processing unit based computing device, and wherein the stored device profile includes one or more properties associated with the processing unit based computing device; and
sending a different profile verification request to the processing unit based computing device each time the processing unit based computing device requests content.

14. The method of claim 13, further comprising:
providing authorization to the processing unit based computing device when the processing unit based computing device is authorized to access the piece of content, wherein the authorization comprises a link that allows the processing unit based computing device to access the piece of content; and
disabling a link for accessing the piece of content when the processing unit based computing device is not authorized to access the piece of content;
wherein each device profile for each processing unit based computing device further comprises a plurality of properties associated with the processing unit based computing device; and
wherein each profile verification request response from each processing unit based computing device further comprises a plurality of properties associated with the processing unit based computing device, wherein verifying the processing unit based computing device further comprises comparing the plurality of properties in the profile verification request response and the device profile for the processing unit based computing device to determine if the processing unit based computing device is authorized to access the piece of content.

15. The method of claim 14, wherein:
for each profile verification request sent to a processing unit based computing device, the profile verification request comprises a request for at least one property associated with the processing unit based computing device; and
for each profile verification request response received from a processing unit based computing device in response to a profile verification request, the profile verification request response further comprises a value for each requested property in the profile verification request, wherein the value is compared against a value for the requested property maintained in the stored device profile for the processing unit based computing device.

16. The method of claim 15, wherein:
for each profile verification request sent to a processing unit based computing device, the profile verification request comprises at least one of the following: a request for a random number of properties associated with the processing unit based computing device, a request for a random order of properties associated with the processing unit based computing device, and a request for a subset of properties associated with the processing unit based computing device.

17. The method of claim 14, wherein:
the plurality of properties associated with a processing unit based computing device further comprise a platform of the processing unit based computing device, a plug-in installed on the processing unit based computing device, a behavior of the plug-in installed on the processing unit based computing device, and a secure protocol negotiation of the processing unit based computing device.

18. The method of claim 12, wherein delivering the piece of content further comprises streaming the piece of content over a link to the processing unit based computing device.

19. The method of claim 12, wherein the content is one of a movie, a television show and a video, music and images.

20. The method of claim 12, further comprising:
for each request for a piece of content from the processing unit based computing device, transmitting a different profile request to the processing unit based computing device.

21. A system for secure content delivery from a content system to a processing unit based computing device, the system comprising:
a processing unit based computing device with a media player that requests a piece of content from a content system over a link; and
the content system further comprises:
a content system manager that receives the request for the piece of content from the processing unit based computing device, sends a profile verification request to the processing unit based computing device, receives a profile verification request response from the processing unit based computing device, and verifies that the processing unit based computing device is authorized to access the piece of content based on the profile verification request response and a device profile of the processing unit based computing device; and
a content unit that delivers the requested piece of content to the processing unit based computing device only when the processing unit based computing device is authorized to access the piece of content;
wherein the profile verification request comprises a request for one or more properties associated with the processing unit based computing device; and
wherein the content system manager is configured to send a different profile verification request to the processing unit based computing device each time the processing unit based computing device requests content from the content system manager, such that each profile verification request is different in terms of number of properties requested, order of properties requested, and particular properties requested.

* * * * *